3,130,183
POLYHYDRAZIDES FROM OXALIC ACID DI-
HYDRAZIDES AND AROMATIC DICAR-
BOXYLIC ACID HALIDES
August Henry Frazer, Wilmington, Del., assignor to E. I.
du Pont de Nemours and Company, Wilmington, Del.,
a corporation of Delaware
No Drawing. Filed Sept. 6, 1960, Ser. No. 53,873
9 Claims. (Cl. 260—78)

This invention relates to a novel class of high molecular weight condensation polymers. More particularly, it relates to high molecular weight condensation polymers containing combined hydrazine, oxalic acid, and aromatic diacid, which exhibit excellent fiber and film properties, high melt temperatures, unusual solubility, and high utility.

It is an object of this invention to provide film- and fiber-forming polymers containing aromatic rings joined by eight-membered linear carbonyl-imido chains.

Another object of this invention is to provide new and useful oxalic-aromatic polyhydrazides.

A further object of this invention is to provide a process for fabrication of oxalic-aromatic polyhydrazides into films and fibers.

Other objectives will appear hereinafter.

In accordance with this invention, there is provided a novel class of film- and fiber-forming hydrazine-based condensation polymers which are characterized by the following recurring structural unit:

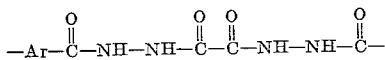

wherein —Ar— represents a divalent aromatic radical having at least three nuclear atoms between points of attachment, such as that derived from an aromatic dicarboxylic acid having at least three nuclear atoms between carboxyl groups. The divalent aromatic radical in each recurring structural unit may be the same or different, with the proviso that at least about 35 mol percent of the aromatic radicals be other than para-phenylene radicals. Such aromatic nuclei may be derived from benzene or related aromatic rings or they may be derived from rings having the character of benzene by virtue of resonance stabilization. Hence, —Ar— represents a benzenoid or heterocyclic aromatic ring system. It is preferred that —Ar— be meta-phenylene. These polymers are of very high molecular weight as is shown by high inherent viscosities and possess high polymer melt temperatures, excellent solubility characteristics, as well as superior film and fiber properties.

The oxalic-aromatic polyhydrazides of this invention have melt temperatures of at least 350° C., frequently up to 400° C. and higher, and inherent viscosities above 0.3, frequently in the range between 0.5 and 1.5 and even higher. Oxalic-aromatic polyhydrazides with melt temperatures above 350° C. and with inherent viscosities higher than 0.5 have greatest utility for the formation of shaped objects, although coherent films and fibers are formed when the polyhydrazides have inherent viscosities in the range of 0.3–0.5.

These novel polymers consist of aromatic diacid, hydrazine, and oxalic acid residues. Several notable features are associated with such structures. One of the building blocks of the polymer, hydrazine, consists of two linked —NH₂ groups. It thus is an inorganic diamine, and can be neither aliphatic nor aromatic. Another building block, oxalic acid, similarly is of unique nature. It consists of two linked —COOH groups. Although conventionally regarded as an organic diacid, it is neither purely aliphatic nor aromatic since there is an absence of chains or rings connecting the functional groups. Finally, then, the last building block of these novel polymers comprises one or more aromatic dicarboxylic acids. As will be disclosed in more detail, it is necessary to employ for polymer preparations oxalic acid and hydrazine in the form of oxalic dihydrazide. This material is combined with equimolar amounts of aromatic dicarboxylic acid chloride or mixtures of aromatic dicarboxylic acid chlorides.

The polymers of this invention are prepared by the low temperature solution method disclosed in my copending application S.N. 48,844 with the substitution of oxalic dihydrazide for hydrazine or aromatic dihydrazide. According to this process, oxalic dihydrazide and aromatic diacid chloride are combined and reacted in a liquid basic medium which functions both as solvent and as acid acceptor. The polymerization is carried out at temperatures not exceeding 100° C., preferably in the range 0–30° C. Suitable solvents are N-methylpyrrolidone and hexamethylphosphoramide. Addition of small amounts of lithium chloride is often desirable since it improves the solvent power of the amide for the polyhydrazide.

More specifically, the preparation is carried out preferably by dispersing oxalic dihydrazide in the amide solvent, which may also contain up to five percent of lithium chloride. The dihydrazide is substantially insoluble. The stirred dispersion is cooled to 0–30° C., and the aromatic diacid chloride in equivalent amounts is slowly added, e.g., over a period of approximately 15–30 minutes. The reaction is permitted to continue until high molecular weight oxalic-aromatic polyhydrazide is formed, as evidenced by an increase in viscosity. The reaction is generally complete in about two to four hours, although longer reaction times may be employed.

Representative and suitable aromatic dicarboxylic acid chlorides having at least three nuclear atoms between functional groups are the diacid chlorides of benzene, such as isophthaloyl chloride and terephthaloyl chloride; of biphenyl, such as bibenzoyl chloride or diphenic acid chloride; of naphthalene, such as napthalene-1,4-dicarbonyl chloride and naphthalene-2,6-dicarbonyl chloride; of pyridine such as pyridine-2,5-dicarbonyl chloride, pyridine-2,6-dicarbonyl chloride and pyridine-3,5-dicarbonyl chloride; of pyrazine, such as pyrazine-2,5-dicarbonyl chloride; and of thiophene, such as thiophene-2,5-dicarbonyl chloride. Examples of suitable substituted aromatic dicarbonyl chlorides are 5-tertbutylisophthaloyl chloride, 5-chloroisophthaloyl chloride, and 2,5-dimethoxyterephthaloyl chloride.

Copolymers may be produced by employing a mixture of two or more aromatic diacid chlorides and equivalent amounts of oxalic dihydrazide to produce copolymers having units of the structure

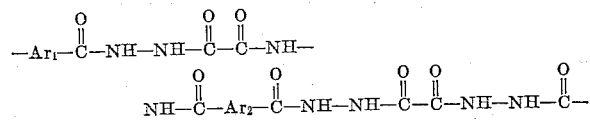

wherein —Ar₁— and —Ar₂— are different aromatic, —Ar—, radicals as defined above.

Although the prior art teachings would indicate that oxalic-aromatic polyhydrazides might be prepared either by combining oxalic dihydrazide and aromatic acid or a derivative thereof or by combining aromatic dihydrazide and oxalic acid or a derivative thereof it has been found to be essential for preparation of high molecular weight film-forming polymers that oxalic dihydrazide be combined with aromatic diacid chloride.

Prior art and my copending application S.N. 48,844 disclose that polyhydrazides may be regarded as falling into one of two distinct classes which differ from each other in kind rather than in degree: the aliphatic polyhydrazides and the aromatic polyhydrazides. Although it could be anticipated that polymer containing the unusual repeat unit

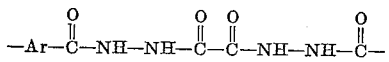

would differ somehow from aliphatic polyhydrazides,

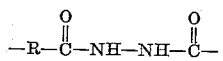

on the one hand and from aromatic, resonance-stabilized polyhydrazides,

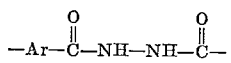

on the other hand, it could not be predicted that oxalic-aromatic polyhydrazides would possess essentially different properties from either aliphatic or aromatic polyhydrazides. Such a conclusion is even less plausible since it was well known from the prior art that oxalic-aliphatic polyhydrazides are generally indistinguishable from all-aliphatic polyhydrazides.

To further compare materials as disclosed in this application, a number of oxalic-aliphatic polyhydrazides, as is shown in Table I, have been prepared by the low temperature solution method of this invention. The products have solubility and melting behaviors like the aliphatic polyhydrazides.

TABLE I

*Oxalic-Aliphatic Copolyhydrazides*

| Dihydrazide | Parts by Weight | Acid Chloride | Parts by Weight | $\eta_{inh}$ [1] | PMT,[2] °C. |
|---|---|---|---|---|---|
| Oxalic | 1.18 | Adipyl | 1.83 | insol | 295 |
| Do | 1.18 | Sebacyl | 2.39 | insol | 300 |

[1] Inherent viscosity in dimethyl sulfoxide at 30° C.
[2] Polymer melt temperature.

The surprising discovery has been made that oxalic-aromatic, unlike oxalic-aliphatic and all-aliphatic, polyhydrazides show a very high degree of solubility in dimethyl sulfoxide and may be fabricated into useful objects from such solutions. High solid solutions in the range of 20–50 percent solids are readily obtained. Solutions of the disclosed class of polyhydrazides are obtained by dissolving the polymer in the cold or by gently warming. They are stable for prolonged periods of time even at room temperature. Such solutions may be used to cast films and to spin fibers.

In order to more fully evaluate the preparation of such oxalic-aromatic polyhydrazides, their preparation has been attempted using a prior art process for aliphatic and oxalic-aliphatic polyhydrazides. Results are shown in Table II.

TABLE II

*Attempted Preparation of Oxalic-Isophthalic Polyhydrazides*

| Dihydrazide | Intermediates | | Polymers | | |
|---|---|---|---|---|---|
| | Parts by Weight | Diacid Derivative | Parts by Weight | $\eta_{inh}$ [1] | PMT,[2] °C. |
| Oxalic | 2.95 | Isophthalic acid | 4.15 | 0.12 | 290 |
| Do | 2.95 | Isophthaloyl chloride | 5.07 | insol. | 310 |
| Do | 2.95 | Dimethyl isophthalate | 4.85 | 0.04 | 250 |
| Isophthalic | 4.85 | Oxalic acid dihydrate | 3.15 | insol. | 240 |
| Do | 4.85 | Oxalyl chloride | 3.17 | 0.12 | 270 |
| Do | 4.85 | Diethyl oxalate | 3.65 | 0.10 | 210 |

[1] Inherent viscosity in dimethyl sulfoxide at 30° C.
[2] Polymer melt temperature.

Preparations were made using 30 parts of nitrobenzene with heating for 3–4 hrs. at 180° C. The product of each of the various attempted preparations was neither uniform, as evidenced from variations in polymer melt temperature and inherent viscosity, nor did it give coherent films by melt pressing or solution casting. It can be seen that products were either insoluble, or had inherent viscosities less than 0.3 and had polymer melt temperatures far below 350° C.

As further discussed in copending application S.N. 800,366, filed March 19, 1959 to August H. Frazer, one may prepare poly(1,3,4-oxadiazoles), a novel class of nitrogen-containing polymers, from polyhydrazides via thermal dehydration and cyclization. It is obvious that a diacyl oxalic hydrazide will lead to a bisoxadiazole in such a process:

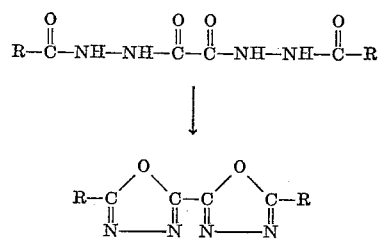

When R— is —Ar— as disclosed herein, a polymeric aryl bis(1,3,4-oxadiazole) is produced. These polymers are highly desirable since they contain a high proportion of oxadiazole rings and are free of aliphatic segments.

In the course of continuing research on polyoxadiazoles, polyhydrazides, and processes therefor, the surprising discovery has been made that oxalic-aromatic polyhydrazides such as, e.g., oxalic-isophthalic polyhydrazides, are converted into the corresponding polyoxadiazoles with conversion rates considerably faster than with aromatic polyhydrazides. Thus, the extreme ease of conversion of oxalic-aromatic polyhydrazides into corresponding polyoxadiazoles is another example of the uniqueness of the oxalic-aromatic polyhydrazides among the other classes of polyhydrazides. This feature of oxalic-aromatic polyhydrazides is of extraordinary technical importance.

The following examples will illustrate the present invention but are not intended to limit it in any way. In these examples, inherent viscosities have been determined in accordance with the following equation.

$$\eta_{inh} \text{ (inherent viscosity)} = \frac{\ln \eta_{rel}}{C}$$

The relative viscosity ($\eta_{rel}$) may be determined by dividing the flow time in a capillary viscometer of a dilute solution of the polymer by the flow time for the pure solvent. The concentration (C) is generally 0.5 gram of polymer per 100 ml. of solution. The measurements are made at 30° C. in dimethyl sulfoxide.

EXAMPLE I

To a suspension of 1.18 grams of oxalic dihydrazide in 35 ml. of N-methylpyrrolidone, which is cooled by means of an ice bath and stirred with the aid of a mechanical stirrer, is added 2.03 grams of pyridine-2,6-dicarbonyl chloride over a period of 20 minutes. The solution is stirred for ten hours. The polymer is precipitated by pouring the solution of polymer in N-methylpyrrolidone into water. It is then washed with alcohol and dried. The final product has an inherent viscosity of 1.01, and a polymer melt temperature of 350° C. A clear, tough film is cast from a solution in dimethyl sulfoxide. Fibers may be spun from solutions in dimethyl sulfoxide.

When the preparation is repeated using equimolar amounts of pyridine-2,6-dicarboxylic hydrazide and oxalyl chloride, no polymer is obtained.

EXAMPLE II

An amount of 1.18 grams of oxalic dihydrazide is suspended in 30 ml. of hexamethylphosphoramide and cooled to 0° C. with an ice bath. To this suspension is added in small portions over a period of twenty-five minutes 2.03 grams of pyrazine-2,5-dicarbonyl chloride. The total is allowed to react overnight. It is precipitated into alcohol, filtered, and dried. The final material has an inherent viscosity of 0.33 in dimethyl sulfoxide and a polymer melt temperature of 380° C. A brittle film is cast from dimethyl sulfoxide.

Attempts to prepare the same polyhydrazide from oxalyl chloride and the corresponding dihydrazide failed because of vigorous interaction and decomposition of oxalyl chloride with the amide solvent.

EXAMPLE III

To a suspension of 1.18 grams of oxalic dihydrazide in 30 ml. of hexamethylphosphoramide containing 0.6 gram of lithium chloride is added in portions and under cooling to 0° C. 2.03 grams of isophthaloyl chloride over a period of twenty minutes. The total reaction mixture is stirred and allowed to react for five hours and then poured into alcohol. The polymer, which precipitates, is washed with alcohol, dried, and exhibits a polymer melt temperature of 350° C. and an inherent viscosity of 0.70 in dimethyl sulfoxide. An excellent film is cast from dimethyl sulfoxide. Excellent fibers may be dry spun or wet spun from solutions in dimethyl sulfoxide.

An attempted preparation of the same polyhydrazide from oxalyl chloride and isophthalic dihydrazide is unsuccessful.

EXAMPLE IV

A solution of 5.9 grams of oxalic dihydrazide in 80 ml. of hexamethylphosphoramide is cooled in an ice bath. To this solution is added, while stirring, 10.15 grams of isophthaloyl chloride, and stirring is continued overnight. Following isolation and washing, the polymer has an inherent viscosity in dimethyl sulfoxide of 1.43 and a polymer melt temperature of 366° C. Its oxygen content is 26.87%. A clear, tough film is cast from dimethyl sulfoxide.

Heating of a 5-gram sample of the above product at a temperature of 255° for 8 hours at 0.05 mm. pressure lowers the oxygen content to 16.93% as a result of completed formation of the corresponding poly bis(1,3,4-oxadiazole).

In contrast, an aromatic polyhydrazide, polyisophthaloyl hydrazide, required 17.5 times longer reaction times and a temperature of 277° C. in vacuo before complete conversion to the corresponding polyoxadiazole had occurred.

Vigorous reaction of oxalyl chloride with the solvent occurs when it is attempted to prepare the described polyhydrazide from oxalyl chloride and isophthalic dihydrazide in hexamethylphosphoramide. No polymer results.

The polymers of this invention are of utility in the formation of films, fibers, and other shaped objects. Films and filaments of the oxalic-aromatic polyhydrazides may be oriented by stretching, for example under steam, and exhibit high modulus, high tenacity and high flex life. They are also characterized by outstanding light and thermal stability. This combination of properties indicates that the polyhydrazides of this invention are of value in numerous textile and industrial uses. Films of the polymers are useful as protective and covering materials, as well as for wrapping purposes. The polymers of this invention provide a particularly valuable class for conversion to poly-bis(1,3,4-oxadiazoles), as disclosed in my aforementioned copending application S.N. 800,366.

What is claimed is:

1. A high molecular weight, fiber and film-forming condensation polymer consisting essentially of the following recurring structural unit

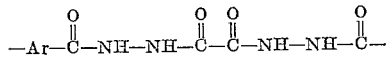

wherein —Ar— represents a divalent aromatic radical having at least three nuclear atoms between points of attachment and having less than 18 carbon atoms with the proviso that less than 65 mol percent of the aromatic radicals are para-phenylene radicals, said polymer having a melt temperature greater than about 350° C. and an inherent viscosity above 0.3, when measured at a concentration of 0.5 gram of polymer per 100 ml. of solution in dimethyl sulfoxide at a temperature of 30° C.

2. The polymer of claim 1 wherein Ar is metaphenylene.

3. The polymer of claim 1 in the form of a self-supporting film.

4. The polymer of claim 1 in the form of an oriented fiber.

5. A spinning solution comprising 20 to 50% of the polymer of claim 1 based on the weight of the solution in dimethyl sulfoxide.

6. A method of making a polymer consisting essentially of the following recurring structural unit:

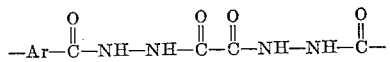

wherein —Ar— represents a divalent aromatic radical having at least three nuclear atoms between points of attachment and having less than 18 carbon atoms with the proviso that less than 65 mol percent of the aromatic radicals are paraphenylene radicals, said polymer having a melt temperature greater than about 350° C. and an inherent viscosity above 0.3, when measured at a concentration of 0.5 gram of polymer per 100 ml. of solution in dimethyl sulfoxide at a temperature of 30° C. which comprises reacting oxalyl dihydrazide in hexamethylphosphoramide with an aromatic diacid chloride at a temperature below 100° C.

7. The process of claim 6 conducted at a temperature between about 0 and 30° C.

8. A method of making a polymer consisting essentially of the following recurring structural unit:

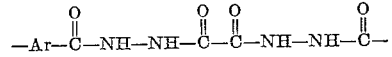

wherein —Ar— represents a divalent aromatic radical having at least three nuclear atoms between points of attachment and having less than 18 carbon atoms with the proviso that less than 65 mol percent of the aromatic radicals are paraphenylene radicals, said polymer having a melt temperature greater than about 350° C. and an inherent viscosity above 0.3, when measured at a concentration of 0.5 gram of polymer per 100 ml. of solution in dimethyl sulfoxide at a temperature of 30° C. which comprises reacting oxalyl dihydrazide in N-methylpyrrolidone with an aromatic diacid chloride at a temperature below 100° C.

9. A method of making a polymer consisting essentially of the following recurring structural unit:

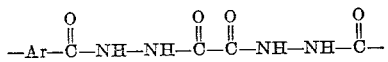

wherein —Ar— represents a divalent aromatic radical having at least three nuclear atoms between points of attachment and having less than 18 carbon atoms with the proviso that less than 65 mol percent of the aromatic radicals are paraphenylene radicals, said polymer having a melt temperature greater than about 350° C. and an inherent viscosity above 0.3, when measured at a concentration of 0.5 gram of polymer per 100 ml. of solution in dimethyl sulfoxide at a temperature of 30° C. which comprises reacting oxalyl dihydrazide in an amide solvent which is substantially inert to the reactants under the conditions of the reaction, with an aromatic diacid chloride at a temperature below 100° C.

References Cited in the file of this patent

UNITED STATES PATENTS

| | | |
|---|---|---|
| 2,252,555 | Carothers | Aug. 12, 1941 |
| 2,395,642 | Prichard | Feb. 26, 1946 |
| 2,544,637 | Caldwell | Mar. 13, 1951 |
| 2,615,862 | McFarlane et al. | Oct. 28, 1952 |
| 2,957,852 | Frankenburg et al. | Oct. 25, 1960 |
| 2,958,677 | Kleinschmidt | Nov. 1, 1960 |